Sept. 30, 1958 J. A. ROGAS 2,853,816
VIEWER FOR FILM SLIDES
Filed Jan. 9, 1956 2 Sheets-Sheet 2

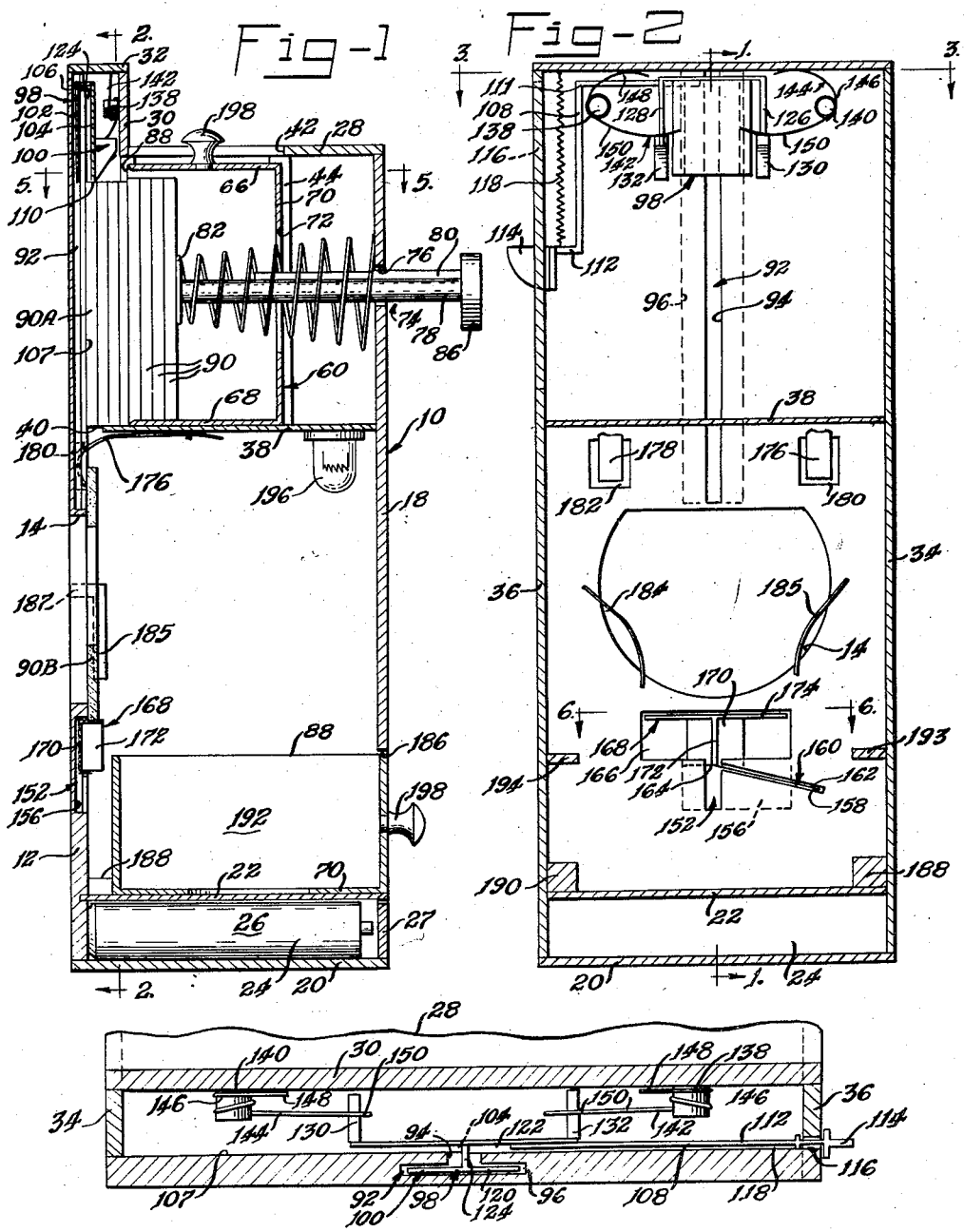

INVENTOR.
John A. Rogas
BY
Marshall A. Burmeister
Attorney

United States Patent Office 2,853,816
Patented Sept. 30, 1958

2,853,816
VIEWER FOR FILM SLIDES
John A. Rogas, Forest Park, Ill.
Application January 9, 1956, Serial No. 558,002
8 Claims. (Cl. 40—78)

The present invention relates generally to photographic devices, and in particular it relates to devices for illuminating film slides.

One type of picture processing produces pictures in the form of flat rectangular slides in which the film is disposed in the center of the slide and a paper or cardboard border fits around the edges of the slide. Many different types of viewers have been devised for viewing these slides, either by projection upon a screen or by direct viewing. One of the difficulties which has been experienced in the use of slide-viewing devices is that the slides wear during use. The slides are generally stacked in a magazine and transported from the magazine to a viewing position, or placed in the viewing position individually by hand, and then collected in a depository. The steps used to transport the slides into and out of the viewing position inevitably result in contact with the various parts of the slide viewer and in friction between one slide and another. As at result, the paper borders of the slides wear and become frayed, often resulting in jamming of the slides within the slide viewer.

One of the principal points of wear in the showing process in most slide-viewing devices is in the means for translating slides to the depository which collects the slides after viewing. Generally, the slides are stacked in parallel relationship and each slide rubs essentially the entire length of the adjacent slide as it enters the depository.

It is one of the objects of the present invention to provide a film slide-viewing device which substantially decreases the wear upon film slides which occurs during the process of showing the slides.

Another difficultly which is experienced in most slide-viewing devices is that dirt and dust become attached to the slides before viewing, resulting in undesirable smudges appearing in the reproduced picture. This dirt often occurs as a result of handling of the slides to place them in the viewing device. It is, therefore, an object of the present invention to provide a film slide-viewing device which does not require individual handling of slides before or after the viewing.

Since each slide represents but a single view, most slide users collect large numbers of film slides. This results in a storage problem, since each slide must be stored in a relatively dark location free from dust and moisture. It is, therefore, a further object of the present invention to provide a slide-viewing device in which slides are stored in containers which may themselves become a portion of the magazine for the viewing device, thereby eliminating the necessity of handling the slides in order to view them.

Broadly speaking, the present invention accomplishes the foregoing objects by providing a film slide-viewing device which has a magazine in which slides to be shown are disposed, a viewing position, and a slide depository. The film slides are stored in boxes which may be placed within a dust-tight and light impermeable cabinet during periods of non-use, and the boxes themselves are insertable into the magazine of the slide-viewing device. Means are provided to transport each slide in sequence from the storage box placed in the magazine of the slide-viewing device to the viewing position, and after viewing, to a second box of identical construction with the box disposed in the magazine. The second storage box may then be inserted into the storage cabinet until it is desired to view the slides once again.

A more complete understanding of the present invention and additional advantages thereof, are contained in the remainder of this disclosure, particularly when considered in the light of the drawings, in which:

Figure 1 is a sectional view of a film slide viewer constructed according to the teachings of the present invention, the view being taken along the line 1—1 of Figure 2;

Figure 2 is a sectional view of the film-viewing device of Figure 1 with the film storage drawers removed, the view being taken along line 2—2 of Figure 1;

Figure 3 is a sectional view taken along the line 3—3 of Figure 2;

Figure 6:
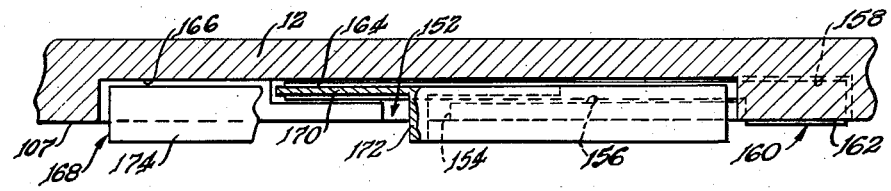
Figure 6 is a sectional view taken along line 6—6 of Figure 2.

As illustrated in the figures, the film viewer has a supporting structure in the form of a generally rectangular housing 10 which is provided with a mounting or front plate 12 which is adapted to be vertically disposed. The front plate 12 is provided with an aperture 14 centrally thereof.

The housing 10 is also provided with a back plate 18 which is disposed parallel to and spaced from the front plate 12. A bottom plate 20 connects the back plate 18 and front plate 12 and is adapted to be disposed on a horizontal surface during periods of use. A support shelf 22 is disposed parallel to the bottom plate 20 and attached to the front plate 12 and the back plate 18, thus forming a battery compartment 24 between the bottom plate 20 and the plate 22. A battery 26 is removably disposed within the battery compartment 24 through a panel 27 in the back plate 18.

The housing 10 is also provided with a top plate 28 which extends from the back plate 18 toward the front plate 12. A support strip 30 is normally secured to the end of the top plate 28 opposite the back plate 18, and an upper strip 32 is secured to the support strip 30 and the front plate 12. The housing 10 also has side plates 34 and 36 which are attached to the other elements of the housing to form a closed unit. A support shelf 38 is secured to the side plates 34 and 36 and the back plate 18 above the opening 14 in the front plate 12, and extends toward the front plate 12 from the back plate 18 leaving a gap 40 between the end of the shelf 38 and the front plate 12 which is greater than the thickness of the slides to be viewed and less than twice the thickness of the slides. The top plate 28 is provided with a rectangular aperture 42 adjacent to the mounting strip 30, and a pair of spaced slide members 44 and 46 are mounted to the side plates 34 and 36, respectively, and extend between the shelf 38 and the top plate 28 adjacent to the two corners of the aperture 42 which confront the back plate 18. Each of the members 44 and 46 is provided with a right angle shaped channel 48 and 50 disposed parallel to the back plate 18.

Figure 5:
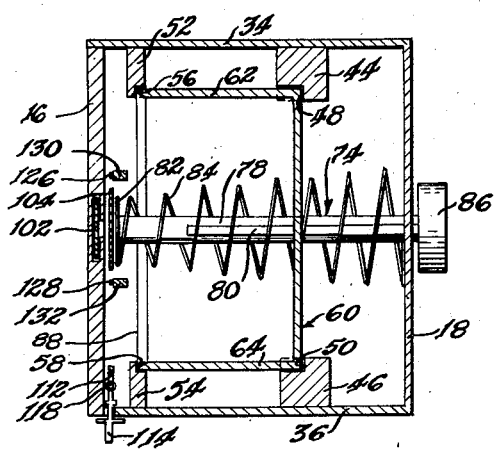
Figure 5 is a sectional view taken along line 5—5 of Figure 1.

A second pair of slide members 52 and 54 (Figure 5) are also mounted to the side plates 34 and 36, respectively, between the top plate 28 and the shelf 38, and are also disposed parallel to the slide members 44 and 46. The slide members 52 and 54 are also provided with right angle shaped channels 56 and 58, respectively, which confront each other and the channels 48 and 50 in the slide members 44 and 46. A box 60 in the shape of a drawer is slidably disposed within the four slide members 44, 46, 52 and 54 between the top plate 28 and the shelf 38.

The drawer 60 is rectangular in shape and has a pair of confronting sides 62 and 64 which are in slidable engagement in the rectangular channels 48, 50, 56 and 58 of the slide members 44, 46, 52 and 54. A front side 66 extends between the sides 62 and 64 confronting the aperture 42, and a back side 68 extends between the sides 62 and 64 in abutment with the shelf 38. The drawer 60 also has a bottom 70 which is secured to and sealed to the sides 62, 64, 66 and 68, and is provided with a central aperture 72 which is circular in form.

A plunger 74 is slidably disposed in an aperture 76 in the back plate 18 of the housing 10 and extends through the aperture 72 in the drawer 60. The plunger 74 has a shaft 78 with a rib 80 on one side which is journaled within the aperture 76, the rib 80 preventing rotation of the plunger in the aperture 76. The end of the plunger 74 within the drawer 60 is provided with an annular plate 82, and a helical spring 84 is disposed between the plate 82 and the confronting surface of the back side 18 of the housing 10, thereby placing a spring bias upon the plunger to force the plunger toward the front face 12 of the housing 10. A knob 86 is secured to the end of the plunger 74 opposite the plate 82 to facilitate withdrawing of the plunger 94 from the drawer 60, so that the drawer 60 may be removed through the aperture 42 in the top plate 28 of the housing 10. The rib 80 does not extend to the plate 82, so that it functions as a stop when the plunger 74 is withdrawn and rotated, thus permitting removal of the drawer 60.

The drawer 60 is provided with an open end 88 on the side opposite the bottom 70, and the slides to be shown, designated 90, are inserted into the drawer 60 through the open end 88 thereof and disposed in abutting relationship with each other parallel to the bottom 70 of the drawer 60. The plunger 74 places a spring bias upon the slides 90 in the direction of the front panel 12 of the housing 10.

The front panel 12 is provided with a channel 92 which extends therein centrally from the top strip 32 to a point adjacent to the opening 14 therein, as shown in Figures 1 through 3. The channel 92 has a narrow opening 94 and an enlarged generally rectangular region 96 communicating with the opening 94, thereby forming a generally T-shaped cross section for the channel 92. The channel 92 forms a guide for a slide-transporting element 98 and a slide-follow-up element 100.

The slide-transporting element 98 has two adjacent plate-shaped portions 102 and 104, the portion 104 being wider than the portion 102. A connecting rib 106 is disposed between the central portions of both plate-shaped portions 102 and 104 to interconnect them. The portion 102 is slidably disposed within the rectangular portion 96 of the channel 92, and the portion 104 of the transporting member 98 confronts the rear surface, designated 107, of the face plate 12. An arm 108 is secured to the portion 104 at its end confronting the top plate 32, and the opposite end of the portion 104, designated 110, abuts the upper surface of the slide 90A abutting the rear surface 107 of the front panel 12. The arm 108 extends from the transporting member 98 toward the side wall 36 of the housing 10 for a distance sufficient to position the arm 108 away from the slides 90, and thence the arm is provided with a right angle bend 111 and extends downwardly to a second right angle bend 112 to a release lever 114 which is slidably disposed within a channel 116 in the wall 36 of the housing 10. A spring 118 extends from the release lever 114 to the top plate 32 of the housing to place a spring bias upon the arm 108 in the direction of the top plate 32 and return the transporting member 98 to a position above the slides 90 after the slide 90A has been transported into alignment with the opening 14 in the front panel 12.

Figure 4:
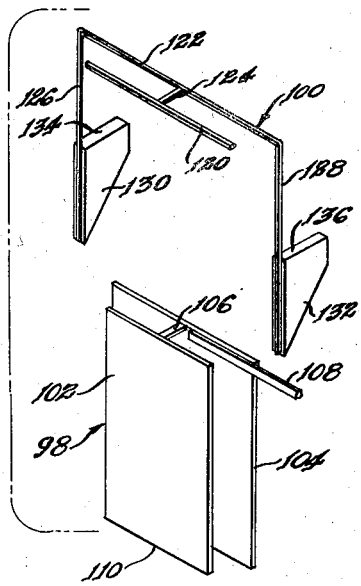
Figure 4 is an isometric view of the devices shown in Figures 1 through 3 for translating film slides to the viewing position.

The guide member 100 (Figures 3 and 4) has a bar 120 which is slidably disposed within the rectangular portion 96 of the channel 92 above and adjacent to the transporting member 98. The bar 120 is attached to a cross bar 122 by a rib 124 extending through the opening 94 of the channel 92, and a pair of depending bars 126 and 128 are secured to the ends of the cross bar 122. Triangular members 130 and 132 are secured to the depending bars 126 and 128 and extend outwardly therefrom normal to the front panel 12 of the housing 10. Each of the triangular members 130 and 132 has an essentially right triangular cross section with its normal portion 134 or 136, respectively, confronting the top plate 32 of the housing 10. The ends of the depending bars 126 and 128, and the adjacent portions of the triangular members 130 and 132 are in abutment with the slide 90A abutting the front face 12 of the housing 10.

The mounting strip 30 is provided with a pair of spaced pins 138 and 140. A pair of springs 142 and 144 are mounted to the mounting strip 30 on the pins 138 and 140, respectively. Each of the springs 142 and 144 is in the form of a wire and is provided with a turn 146 between its end legs 148 and 150, the turn 146 being disposed about the post 138 or 140. The legs 148 of each spring 142 and 144 abut the top strip 32 adjacent to their ends, and the legs 150 of each spring 142 and 144 abut the surfaces 134 and 136 of the triangular members 130 and 132 of the guide member 100, thereby placing a spring bias upon the guide member 100 in the direction of the opening 14 in the front panel 12 of the housing 10.

A second channel 152 (Figures 1 and 6) is disposed below the opening 14 in the front panel 12 and generally aligned with the channel 92 above the opening 14. The channel 152 has a slot 154 extending through the rear surface 107 of the front panel 12 generally aligned with the slot 94 of the channel 92. The slot 154 communicates with a cavity 156 which is rectangular in form and extends toward the wall 36 of the casing a distance equal to the distance that the rectangular portion 96 extends from the slot 94 toward the wall 36, and the cavity 156 extends a much greater distance toward the wall 34. A channel 158 enters the cavity 156 adjacent to the corner of the cavity 156 confronting the side wall 34 and bottom 20, and a leaf spring 160 is secured within the channel 158 at an end portion 162 of greater cross section than the other end portion 164. The portion 164 is sufficiently thin to be bendable within the cavity 156 and extends essentially across the entire cavity 156.

The rear surface of the front panel 12 is provided with a recess 166 immediately above the cavity 156 which extends to a point adjacent to the opening 14. A slide support member 168 is slidably disposed within the recess 166 and the channel 152. The slide support member 168 has a guide plate 170 which is slidably disposed within the cavity 156, and an alignment rib 172 which extends from the plate 170 through the slot 154. The lower end of the alignment rib 172 abuts the end 164 of the strip spring 160, thus placing a spring bias upon the slide support 168 in the direction of the opening 14 in the front panel 12. A flat plate 174 is secured to the rib 172 and the member 170 and disposed horizontally beneath the opening 14. The plate 174 protrudes into the housing 10 from the back surface 107 of the front panel 12, and holds a slide in the viewing position, designated 90B in Figure 1, in position before the opening 14.

A pair of leaf springs 176 and 178 are secured to the shelf 38 on the side opposite the drawer 60 and curve away from the shelf 38 and toward the rear surface 107 of the front panel 12. Each of the leaf springs 176 and 178 is disposed to abut the indentations 180 and 182 in the rear surface of the front panel 12 on opposite sides of the channel 92. The ends of the springs 176 and 178 are thus disposed between the front panel 12 and a slide 90B in viewing position. When the next slide is pushed down into viewing position, the bottom of the slide forces the springs 176 and 178 outward and engages the ends of the springs with the film 90B, thus ejecting the film.

A second pair of leaf springs 184 and 185 are mounted to the rear surface of the front panel 12 on opposite sides of the aperture 14 and beneath the leaf springs 176 and 178. These springs 184 and 185 are provided with tabs 187 which are anchored in the front panel 12 and mount the springs 184 and 185 at an angle of approximately 45 degrees relative to the plate 174 without a slide in the viewing position. A slide 90B in the viewing position is wedged between the springs 184 and 185 and thus held in position.

A rectangular aperture 186 is disposed in the back side 18 of the housing 10 extending upwardly from the support shelf 22, the aperture 186 being rectangular and identical in shape with the aperture 42 in the top plate 28. A pair of parallel alignment ribs 188 and 190 are secured to the support shelf 22 on opposite sides of the aperture 186 and a second box, or drawer 192 is slidably disposed between the ribs 188 and 190 in abutment with the shelf 22. This drawer 192 is identical with the drawer 60 confronting the aperture 42 in the top plate 28, and is disposed with its open side 88 confronting the first shelf 38. A second pair of ribs 193 and 194 are mounted to the side walls 34 and 36, respectively, above the drawer 192 to guide the drawer. The first shelf 38 also supports a lamp 196 which confronts the opening 14 in the front panel 12. The lamp 196 is connected to the battery 26 in the battery compartment 24 and is used to illuminate the slide 90B positioned adjacent to the opening 14.

Both of the slide drawers 60 and 192 are readily removable from the housing 10 and are provided with knobs 198 which protrude through the apertures 42 and 186, respectively. The film slides 90 are disposed parallel to the bottoms 70 of each of the drawers 60 and 192, as will be explained below.

When it is desired to show films, the films are disposed in abutting relationship parallel to the bottom 70 of the drawer 60. Generally speaking, it is most convenient to house the drawers in a storage cabinet with the slides aligned parallel to the bottom 70 thereof, and the drawer may simply be removed from the cabinet and inserted into the housing 10 through the aperture 42, having first withdrawn the plunger 74 behind the two slide members 44 and 46. The plunger 74 is then released and the plate 82 at the end of the plunger contacts the slides 90 within the drawer 60 to push the slides 90 toward the rear surface 107 of the front panel 12. The slide 90A which abuts the rear surface 107 of the front panel is ready to be translated to the showing position at this point. The lamp 196 is then energized by the battery 26, and the lever 114 depressed to cause the slide-transporting device 98 to abut against the upper surface of the slide 90A and force it into contact with the leaf springs 176 and 178.

The leaf springs 176 and 178 act as ejection levers for film slide 90B. When the next film slide 90A is pushed down into viewing position, the bottom of the slide 90A forces the two springs 176 and 178 outwardly from the recesses 180 and 182 from which position the film slide 90B drops into the drawer 192.

These springs 176 and 178 at the same time act as a force to hold the film slide coming down against the front surface 107. When the film is about three-fourths of the way down, the outer edges of the slide engage springs 184 and 185 which continue to hold the film in a vertical position as it comes down, and the bottom of the slide touches the ledge 174.

Further pressure on lever 114 moves the film 90B and plate 174 down until the springs 176 and 178 clear the top of the film 90B and abut against the recesses 180 and 182. When pressure is released on the lever 114, the plate 174 is spring biased upward by spring 160 until it can go up no further and the film is then in viewing position and is held vertically by springs 184 and 185. The springs 176 and 178 are then in a position to reject the viewed film and to hold succeeding films flush against the surface 107. The slide 90B then is wedged between the springs 184 and 185 and may be viewed. The follow-up mechanism 100 follows the slide 90A as it moves downwardly to form a wedge between the back surface 107 of the front panel 12 and the slides 90 in the drawer 60. As a result, the slide 90A is free to slide downwardly without friction against the adjacent slide resting on the shelf 38. In this manner, there is little wear imposed on the slides by the step of translating the slides from the magazine to the viewing position. When the lever 114 is released, the transporting device 98 and follow-up mechanism 100 will again assume a position above the slides 90.

The following slide may be viewed from the drawer 60 by again depressing the lever 114. This slide 90A will contact upper surfaces of spring 176 and 178 thus causing the springs to bend backwards forcing film 90B to pivot on support plate 174 and fall horizontally into drawer 192. The film is further forced down by mechanism 98 until the bottom of the slide touches plate 168. Further pressure moves the film slide and plate 168 down until the springs 176 and 178 clear the top of the film 90B and abut against the recesses 180 and 182. When pressure is released on the lever 114 the plate 168 is spring biased upward by spring 164 until surface 170 of plate 168 hits the top of the cavity 152. The film is then in viewing position, and the springs 176 and 178 are returned above and in front of film 90B. The process may be repeated until all of the slides are transferred from the drawer 60 to the drawer 192. The drawer 192 may then be removed through the aperture 186 and placed in a storage cabinet, and the drawer 60 may be removed through the aperture 42 after withdrawing the plunger 74. This drawer is now empty and may be inserted into the housing 10 through the aperture 186 to become the receptacle drawer 192 for the next batch of slides.

The film viewing device illustrated above utilizes all of the space available in the drawers for the storage of slides, and thus for a given amount of storage capacity in a storage cabinet, or the like, a maximum number of slides may be disposed and subsequently viewed. Also, this construction permits a maximum number of slides to be shown without replacing the slide supply drawer 60 since the drawer contains slides abutting each other. Due to the fact that the plunger 74 is required to place very little force upon the slides 90 within the drawer 60, and even this force is removed from the slide 90A during translation by the follow-up mechanism 100, very little wear is imposed upon the slides during the process of removing them from the drawer 60. Further, the mechanism used to deposit the slides in the drawer 192 requires very little contact with other parts of the viewing device, or with other slides, thus minimizing the wear upon the frames of the film slides.

The inventor's film viewer is of simple construction and inexpensive. It is clearly adaptable for projection work by inserting an optical system in the opening 14 and positioning the lamp 196 in the proper position for the optical system. It is also clearly usable with stereoscopic slides.

The foregoing disclosure sets forth but one illustrative embodiment of the invention, and is not intended in any manner to set forth the scope of the present invention. It is therefore intended that the scope of the present invention be limited only by the appended claims.

The invention claimed is:

1. A slide viewing device comprising, in combination, a support structure including a mounting plate having an aperture therein, a rectangular box open at one side removably mounted above the aperture in the mounting plate with its open side spaced from and confronting the mounting plate, the wall opposite the open side of the box having an orifice therein and said box being adapted to contain a plurality of rectangular slides in abutting relationship parallel to the orificed wall thereof, a member reciprocally mounted to the support structure and slidably disposed within the orifice in the wall of said box, means attached to the member for spring biasing the member toward the open side of the box, and slide transporting means disposed between the open side of the box and the mounting plate for transporting the slide confronting the mounting plate into register with the aperture in the mounting plate.

2. A slide viewing device comprising the elements of claim 1 in combination with a second box identical with the first box removably mounted adjacent to the mounting plate on the side of the aperture therein opposite to the first box with its open side disposed normal to the mounting plate, said slide transporting means also transporting slides from registry with the aperture in the mounting plate into the second box parallel to the orificed wall thereof.

3. A viewing device comprising, in combination, a housing having a mounting plate with an opening therein, a back plate, and a top plate disposed between the back plate and the mounting plate provided with a rectangular aperture adjacent to the mounting plate, said housing having a shelf disposed spaced from and normal to the mounting plate between the opening therein and the top plate, guide means adapted to engage a rectangular box disposed between the shelf and the top plate adjacent to the aperture therein, a plunger journaled within an aperture in the back plate extending toward the mounting plate through a region confronting the aperture in the top plate, a helical spring disposed between the back plate and the end of the plunger confronting the mounting plate to spring bias the plunger in the direction of the mounting plate, a channel disposed within the mounting plate having a relatively narrow slot extending through the surface of the front plate along an axis extending from the opening in the front plate toward the top plate and confronting the plunger, a slide transporting member having a portion slidably disposed within the channel and a portion extending outwardly from the surface of the mounting plate through the slot therein a distance approximately equal to the thickness of the slides to be viewed, an arm coupled to the slide transporting mechanism, a helical spring disposed between the arm and the top plate spring biasing the arm toward the top plate, and a lever disposed at the end of the arm for applying force to transport the slides into registry with the opening.

4. A film slide viewing device comprising the elements of claim 3 in combination with a slide follow-up mechanism including a bar slidably disposed within the channel in the mounting plate above the slide transporting mechanism, a cross bar attached to the bar and disposed adjacent to the surface of the mounting plate, a pair of depending members attached to the ends of the cross bar, said members terminating in wedge-shaped surfaces adapted to wedge between the front plate and the adjacent slide in the box, and spring biasing means coupled to the follow-up mechanism for applying a force on the follow-up mechanism in the direction of the slide transporting means.

5. A slide viewing device comprising, in combination, a mounting structure including a plate with an opening therein and an elongated channel disposed within the plate, said plate having a relatively narrow slot extending from the channel through one surface of the plate along an axis extending from the opening therein, means for positioning a stack of parallel slides parallel to and abutting the plate, a slide transporting member having a portion slidably disposed within the channel having a surface remote from the opening disposed normal to the axis of the channel and a portion extending outwardly from said surface of the plate through the slot therein a distance approximately equal to the thickness of the slide to be viewed, an arm coupled to the slide transporting member for applying force to transport the slide into registry with the opening, a slide follow-up mechanism including a bar slidably disposed within the channel in the plate normal to the axis thereof on the side of the slide transporting member remote from the opening in the plate, a cross bar parallely attached to the bar and disposed adjacent to the surface of the plate, a pair of depending members attached to the ends of the cross bar, said depending members terminating in wedge shaped portions adapted to wedge between the plate and an adjacent slide, and spring biasing means coupled to the follow-up mechanism for applying a force on the follow-up mechanism in the direction of the slide transporting member.

6. A slide transporting mechanism comprising a supporting structure including a first plate having an opening therein and a recess adjacent to the opening, slide storage means for positioning slides in parallel abutment with the first plate disposed aligned with the recess and opening, a leaf spring mounted to the supporting structure generally normal to the first plate and resiliently abutting the recessed surface of the first plate, a second plate yieldably mounted normal to the first plate and normal to the direction of translation of the slides, and said second plate being disposed adjacent to the side of the aperture remote from the recess to position a slide in register with the opening and said slide extending to confront the recess, and means to translate a slide from the storage means toward the aperture in the first plate, whereby the translated slide abuts the leaf spring and the leaf spring abuts a slide in register with the opening in the first plate to eject said slide.

7. A film slide transporting mechanism comprising the elements of claim 6 in combination with a pair of leaf springs mounted at one end to the first plate adjacent to the second plate, said springs being disposed on opposite sides of the opening and adapted to secure a slide therebetween when the slide is in register with the opening.

8. A film slide transporting mechanism comprising a mounting structure including a first plate with an opening therein and a first elongated channel disposed within the first plate, said first plate having a relatively narrow first slot extending through one surface of the first plate into the first channel, said first slot extending along an axis from the opening in the first plate, means for positioning a slide parallel to and abutting the first plate, a slide transporting member having a portion slidably disposed within the first channel and a portion extending outwardly from said surface of the first plate through the first slot therein a distance approximately equal to the thickness of the slide to be viewed, said first plate being provided with a second elongated channel aligned with the first channel and disposed on the opposite side of the opening from the first channel, said first plate having a second slot extending through the surface of the first plate, a translatable key disposed within the second slot, a second plate exterior to the channel and normally abutting the first plate secured to the key, and a spring secured to the first plate abutting the key, said spring biasing the second plate toward the opening.

(References on following page)

References Cited in the file of this patent

UNITED STATES PATENTS

| | | |
|---|---|---|
| 158,900 | Bryan | Jan. 19, 1875 |
| 845,052 | Caille | Feb. 26, 1907 |
| 1,312,806 | Powers | Aug. 12, 1919 |
| 2,379,030 | Neitzel | June 26, 1945 |
| 2,503,239 | Antos | Apr. 11, 1950 |
| 2,513,102 | Parlini et al. | June 27, 1950 |
| 2,533,441 | Estes | Dec. 12, 1950 |
| 2,617,218 | Antos | Nov. 11, 1952 |
| 2,634,653 | Barth | Apr. 14, 1953 |
| 2,705,437 | Lessman | Apr. 5, 1955 |